(12) United States Patent
Souchard

(10) Patent No.: US 8,750,636 B2
(45) Date of Patent: Jun. 10, 2014

(54) SMOOTHING AND/OR LOCKING OPERATIONS IN VIDEO EDITING

(75) Inventor: Christophe Souchard, Marina Del Rey, CA (US)

(73) Assignee: Apple Inc., Cupertino, CA (US)

( * ) Notice: Subject to any disclaimer, the term of this patent is extended or adjusted under 35 U.S.C. 154(b) by 287 days.

(21) Appl. No.: 13/164,614

(22) Filed: Jun. 20, 2011

(65) Prior Publication Data

US 2011/0311202 A1   Dec. 22, 2011

Related U.S. Application Data

(63) Continuation of application No. 11/107,327, filed on Apr. 16, 2005, now Pat. No. 7,978,925.

(51) Int. Cl.
*G06K 9/40*   (2006.01)

(52) U.S. Cl.
USPC ........... 382/254; 382/275; 382/107; 382/190; 348/208.99; 348/208.4; 348/208.13; 348/607; 348/700; 348/701

(58) Field of Classification Search
USPC .................. 382/107, 254, 260, 275, 309; 348/208.99, 208.4, 208.13, 606, 607, 348/620, 700, 701
See application file for complete search history.

(56) References Cited

U.S. PATENT DOCUMENTS

| | | | |
|---|---|---|---|
| 3,620,747 A | 11/1971 | Marchant et al. | |
| 3,647,463 A | 3/1972 | Taber et al. | |
| 3,663,228 A | 5/1972 | Wyckoff | |
| 3,888,676 A | 6/1975 | Evans | |
| 4,647,975 A | 3/1987 | Alston et al. | |
| 4,777,122 A | 10/1988 | Beltramini | |
| 5,144,442 A | 9/1992 | Ginosar et al. | |
| 5,162,914 A | 11/1992 | Takahashi et al. | |
| 5,323,204 A | 6/1994 | Wheeler et al. | |
| 5,325,449 A | 6/1994 | Burt et al. | |
| 5,627,905 A * | 5/1997 | Sebok et al. | 382/107 |
| 5,828,793 A | 10/1998 | Mann | |
| 6,104,441 A | 8/2000 | Wee et al. | |
| 6,266,103 B1 * | 7/2001 | Barton et al. | 348/675 |
| 6,459,822 B1 * | 10/2002 | Hathaway et al. | 382/296 |
| 6,535,650 B1 | 3/2003 | Poulo et al. | |

(Continued)

FOREIGN PATENT DOCUMENTS

| | | |
|---|---|---|
| WO | WO2012/006251 | 1/2012 |
| WO | WO2012/006252 | 1/2012 |
| WO | WO2012/006253 | 1/2012 |

OTHER PUBLICATIONS

Yu-Ming Liang et al. Stabilizing image sequences taken by the camcorder mounted on a moving vehicle. Intelligent Transportation Systems, Proceedings. 2003 IEEE vol. 1, pp. 90-95.*

(Continued)

*Primary Examiner* — Matthew Bella
*Assistant Examiner* — Julian Brooks
(74) *Attorney, Agent, or Firm* — Adeli LLP

(57) ABSTRACT

Some embodiments allow a video editor to remove unwanted camera motion from a sequence of video images (e.g., video frames). Some embodiments are implemented in a video editing application. Some of these embodiments distinguish unwanted camera motion from the intended underlying motion of a camera (e.g., panning and zooming) and/or motion of objects within the video sequence.

24 Claims, 10 Drawing Sheets

(56) References Cited

U.S. PATENT DOCUMENTS

| | | | |
|---|---|---|---|
| 6,549,643 | B1 | 4/2003 | Toklu et al. |
| 6,900,840 | B1 | 5/2005 | Schinner et al. |
| 7,023,913 | B1 | 4/2006 | Monroe |
| 7,280,753 | B2 * | 10/2007 | Oya et al. ............. 396/429 |
| 7,312,819 | B2 * | 12/2007 | Ma et al. ............. 348/208.1 |
| 7,602,401 | B2 | 10/2009 | Nishida et al. |
| 7,912,337 | B2 | 3/2011 | Souchard |
| 7,978,925 | B1 | 7/2011 | Souchard |
| 2001/0010555 | A1 | 8/2001 | Driscoll, Jr. |
| 2003/0090593 | A1 * | 5/2003 | Xiong ............. 348/620 |
| 2004/0085340 | A1 * | 5/2004 | Dimitrova et al. ............. 345/723 |
| 2004/0114799 | A1 * | 6/2004 | Xu ............. 382/173 |
| 2005/0041883 | A1 * | 2/2005 | Maurer et al. ............. 382/260 |
| 2006/0177150 | A1 | 8/2006 | Uyttendaele et al. |
| 2006/0262363 | A1 | 11/2006 | Henley |
| 2007/0024742 | A1 | 2/2007 | Raskar et al. |
| 2008/0316354 | A1 | 12/2008 | Nilehn et al. |
| 2009/0202176 | A1 | 8/2009 | Hwang et al. |
| 2010/0157078 | A1 | 6/2010 | Atanassov et al. |
| 2011/0116767 | A1 | 5/2011 | Souchard |
| 2012/0002082 | A1 | 1/2012 | Johnson et al. |
| 2012/0002898 | A1 | 1/2012 | Cote et al. |
| 2012/0002899 | A1 | 1/2012 | Orr, IV et al. |

OTHER PUBLICATIONS

Kimia, B.B.; Siddiqi, K.; Geometric heat equation and nonlinear diffusion of shapes and images. Computer Vision and Pattern Recognition, 1994. Proceedings CVPR '94., 1994 IEEE Computer Society Conference on Jun. 21-23, 1994; pp. 113-120.*

International Search Report for PCT/US2011/042884, Oct. 27, 2011 (mailing date), Apple Inc.

International Search Report for PCT/US2011/042885, Aug 29, 2011 (mailing date), Apple, Inc.

International Search Report for PCT/US2011/042886, Oct. 28, 2011 (mailing date), Apple Inc.

Adams, Andrew, et al., "Viewfinder Alignment," Computer Graphics Forum, Apr. 1, 2008, pp. 597-606, vol. 27, No. 2, Blackwell Publishing, United Kingdom and USA.

Akyuz, Ahmet Oguz, et al., "Noise Reduction in High Dynamic Range Imaging," Journal of Visual Communication and Image Representation, Sep. 5, 2007, pp. 366-376, vol. 18, No. 5, Academic Press, Inc., USA.

Asari, K. Vijayan, et al., "Nonlinear Enhancement of Extremely High Contrast Images for Visibility Improvement," Computer Vision, Graphics and Image Processing Lecture Notes in Computer Science, Jan. 1, 2007, pp. 240-251, Springer-Verlag, Berlin, Germany.

Bilcu, Radu Ciprian, et al., "High Dynamic Range Imaging on Mobile Devices," The 15$^{th}$ IEEE International Conference on Electronics, Circuits and Systems, Aug. 31, 2008, pp. 1312-1315, New Jersey, USA.

Bovik, Al, "The Essential Guide to Image Processing," Jan. 1, 2009, pp. 61-63, 158-161, Academic Press, Elsevier, USA.

Cerman, Lukas, "High Dynamic Range Images for Multiple Exposures," Diploma Thesis, Jan. 26, 2006, pp. 1-52, Prague, Czech Republic.

Granados, Miguel, et al., "Optimal HDR Reconstruction with Linear Digital Cameras," Proceedings of the IEEE Conference on Computer Vision and Pattern Recognition, Jun. 13-18, 2010, pp. 215-222, New Jersey, USA.

Howard, Jack, "The Pentax K-7: The era of in-camera High Dynamic Range Images has arrived!," URL:http//www.adorama.com/aic/blogarticle/The-Pentax-K-7-The-era-of-in-camera-High-Dynamic-Range-Imaging-has-arrived, May 20, 2009, pp. 1-2.

Jacobs, Katrien, et al., "Automatic High-Dynamic Range Image Generation for Dynamic Scenes," IEEE Computer Graphics and Applications, Mar. 1, 2008, pp. 84-93, vol. 27, No. 2, IEEE Computer Society, New York, USA.

Kuang, Jiangtao, et al., "Evaluating HDR Rendering Algorithms," ACM Transactions on Applied Perception, Jul. 1, 2007, 30 pages, vol. 4, No. 2, ACM.

Mann, S., et al., "On Being 'Undigital' with Digital Cameras: Extending Dynamic Range by Combining Differently Exposed Pictures," Imaging Science and Technologies 48$^{th}$ Annual Conference Proceedings, May 1, 1995, pp. 442-448.

Mertens, Tom, et al., "Exposure Fusion," 15$^{th}$ Pacific Conference on Computer Graphics and Applications, Oct. 29, 2007, pp. 382-390, IEEE Computer Society, New Jersey, USA.

Mitsunaga, Tomoo, et al., "Radiometric Self Calibration," Proceedings of the IEEE Computer Society Conference on Computer Vision and Pattern Recognition, Jun. 23-25, 1999, pp. 374-380, The Institute of Electrical and Electronics Engineers, Inc., Colorado, USA.

Petschnigg, Georg, et al., "Digital Photography with Flash and No-Flash Image Pairs," Proceedings of the ACM SIGGRAPH, Aug. 8, 2004, pp. 664-672, ACM, New York, USA.

Unaldi, Numan, et al., "Nonlinear technique for the enhancement of extremely high contrast color images," Proceedings of the Society of Photographic Instrumentation Engineers, Month Unknown, 2008, 11 pages, vol. 6978, SPIE Digital Library.

Wen-Chung, Kao, et al., "Integrating Image Fusion and Motion Stabilization for Capturing Still Images in High Dynamic Range Scenes," IEEE Tenth International Symposium on Consumer Electronics, Jun. 28, 2006, 6 pages.

U.S. Appl. No. 12/876,095, filed Sep. 3, 2010, Johnson, Garrett M., et al.

U.S. Appl. No. 12/876,097, filed Sep. 3, 2010, Orr IV, James Edmund, et al.

U.S. Appl. No. 12/876,100, filed Sep. 3, 2010, Cote, Guy, et al.

Portions of prosecution history of U.S. Appl. No. 12/876,095, Jul. 8, 2011, Johnson, Garrett M., et al.

Portions of prosecution history of U.S. Appl. No. 12/876,097, Nov. 3, 2011, Orr IV, James Edmund, et al.

Portions of prosecution history of U.S. Appl. No. 12/876,100, Jul. 8, 2011, Cote, Guy, et al.

Portions of prosecution history of U.S. Appl. No. 11/266,101, Feb. 15, 2011, Souchard, Christophe.

Portions of prosecution history of U.S. Appl. No. 11/107,327, Jun. 8, 2011, Souchard, Christophe.

Debevec, Paul E., et al., "Recovering High Dynamic Range Radiance Maps from Photographs", Month Unknown, 1997, pp. 369-378, ACM Press/Addison-Wesley Publishing Co., New York, NY.

Kimia, Benjamin B., et al., "Geometric Heat Equation and Nonlinear Diffusion of Shapes and Images", Computer Vision and Pattern Recognition 1994, Proceedings CVPR '94, 1994 IEEE Computer Society Conference on Jun. 21-23, 1994, pp. 113-120.

Liang, Yu-Ming, et al., "Stabilizing Image Sequences Taken by the Camcorder Mounted on a Moving Vehicle", Proceedings of IEEE 6th International Conference on Intelligent Transportation Systems, Oct. 2003, pp. 90-95, vol. 1, Shanghai, China.

Ward, Greg, "Fast, Robust Image Registration for Compositing High Dynamic Range Photographs from Handheld Exposures", Journal of Graphics Tools 8.2, 2003, Month Unknown, pp. 17-30, A K Peters, LTD, Natick, MA.

* cited by examiner

SMOOTHING AND/OR LOCKING OPERATIONS IN VIDEO EDITING

CLAIM OF BENEFIT TO PRIOR APPLICATION

This Application is a continuation application of U.S. patent application Ser. No. 11/107,327, now issued as U.S. Pat. No. 7,978,925, filed Apr. 16, 2005. U.S. patent application Ser. No. 11/107,327, now issued as U.S. Pat. No. 7,978,925, is incorporated herein by reference.

BACKGROUND

High quality video photography and digital video photography equipment are increasingly accessible to a broad range of businesses and individuals, from large and small movie production studios to average consumers. With the proliferation of video cameras and video photographers, the amount of video footage that has been recorded has also increased. With the increase in video footage, there has also been an increase in the amount of footage recorded under a variety of conditions. These conditions include not only environmental and mechanical factors in video recording, but also the steadiness of the hand holding the camera, and the eye behind the viewfinder. The variance in recording conditions, and the hands performing the camera work have lead to a varied amount of jitter, or steadiness in the recorded video.

The problem of jitter has long existed. Today, there are some mechanical and hardware attempts to cope with jitter. These attempts suffer from a number of drawbacks. The higher quality mechanical solutions are prohibitively expensive and only available to specialized video production studios. Moreover, attempts to reduce unwanted camera motion involving a fixed camera (e.g., a camera mounting solution) do not always lend themselves to the conditions available for shooting the footage. Other attempts involving optical lens mechanisms fall short of correcting for jitter and are typically available only on more expensive camera equipment. Further, none of these solutions are available for video that has already been recorded. Thus, there is a need for an accessible and practical method for video editing that removes unwanted motion from a recorded video sequence of frames.

SUMMARY OF THE INVENTION

Some embodiments allow a video editor to remove unwanted camera motion from a sequence of video images (e.g., video frames). Some embodiments are implemented in a video editing application. Some of these embodiments distinguish unwanted camera motion from the intended underlying motion of a camera (e.g., panning and zooming) and/or motion of objects within the video sequence.

The video editing application of some embodiments has a user selectable smoothing operation that when selected removes the unwanted camera motion from a video sequence. In some embodiments, the application allows a user to specifically select the types of camera movements that should be "smoothed". The smoothing operation generates a set of curves that track the set of camera movements that were selected for smoothing. To generate these curve set, the smoothing operation of some embodiments selects a particular motion model, and then identifies the parameters of this model based on movement of certain image elements (e.g., certain pixels) in the selected video sequence. The identified parameters specify the set of curves. These set of curves are a set of unsmoothed curves that might have jagged edges that reflect jittery camera motion.

In some embodiments, the smoothing operation then "smoothes" the generated curves by reducing the jagged edges in these curves. In other words, the smoothing operation of some embodiments removes the high frequency fluctuations from the curves. The smoothing operation of some embodiments then uses the difference between the unsmoothed curve set and the smoothed curve set to define a set of transforms. This operation then applies the set of transforms to each video image (e.g., frame) in the selected video sequence to remove unwanted camera motion from these images. In other words, the application of the set of transforms to the selected video sequence results in a modified video sequence that has eliminated most or all of the undesired camera movement.

The video editing application of some embodiments provides for a lock operation that locks the field of view for a video sequence to the field of view of an image in the sequence. Specifically, in some embodiments, the lock operation is applied to a video sequence by defining a video image in the sequence as the image that defines the locked field of view. The locking operation then defines a transform for each other image in the sequence that moves (e.g., through translation, rotation, zooming, etc.) the field of view of the other image to match the locked field of view.

After performing this locking operation, the video editor can then add one or more objects to the video sequence that are at locations that remains constant to one or more previously defined objects in the video sequence. The added object(s) can be defined for some or all the images (e.g., frames) in the video sequence. In some embodiments, the video editing application allows the video editor to unlock a set of images in the video sequence, after locking them and adding objects to them. The added objects then maintain their constant positions to the previously defined object in the video images, even though the video images might no longer have a constant field of view. In other words, the added fixed object will appear in the video sequence with any original camera motion (such as panning, rotation, zooming, etc.) taken into account.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

I. Video Sequence Smoothing

A. Overview

Some embodiments allow a video editor to remove unwanted camera motion from a video sequence. As used in this document, a video sequence is a set of images from any media, including any broadcast media or recording media, such as camera, film, DVD, etc. Some embodiments are implemented in a video editing application. Some of these embodiments distinguish unwanted camera motion from the intended underlying motion of a camera (e.g., panning and zooming) and/or motion of objects within the video sequence.

The video editing application of some embodiments has a user selectable smoothing operation that when selected removes the unwanted camera motion from a video sequence. In some embodiments, the application allows a user to specifically select the types of camera movements that should be "smoothed". The smoothing operation generates a set of curves that track the set of camera movements that were selected for smoothing. To generate these curve set, the smoothing operation of some embodiments selects a particular motion model, and then identifies the parameters of this model based on movement of certain image elements (e.g., certain pixels) in the selected video sequence. The identified parameters specify the set of curves. These set of curves are a set of unsmoothed curves that might have jagged edges that reflect jittery camera motion.

In some embodiments, the smoothing operation then "smoothes" the generated curves by reducing the jagged edges in these curves. In other words, the smoothing operation of some embodiments removes the high frequency fluctuations from the curves. The smoothing operation of some embodiments then uses the difference between the unsmoothed curve set and the smoothed curve set to define a set of transforms. This operation then applies the set of transforms to each video image (e.g., frame) in the selected video sequence to remove unwanted camera motion from these images. In other words, the application of the set of transforms to the selected video sequence results in a modified video sequence that has eliminated most or all of the undesired camera movement.

Figure 1:
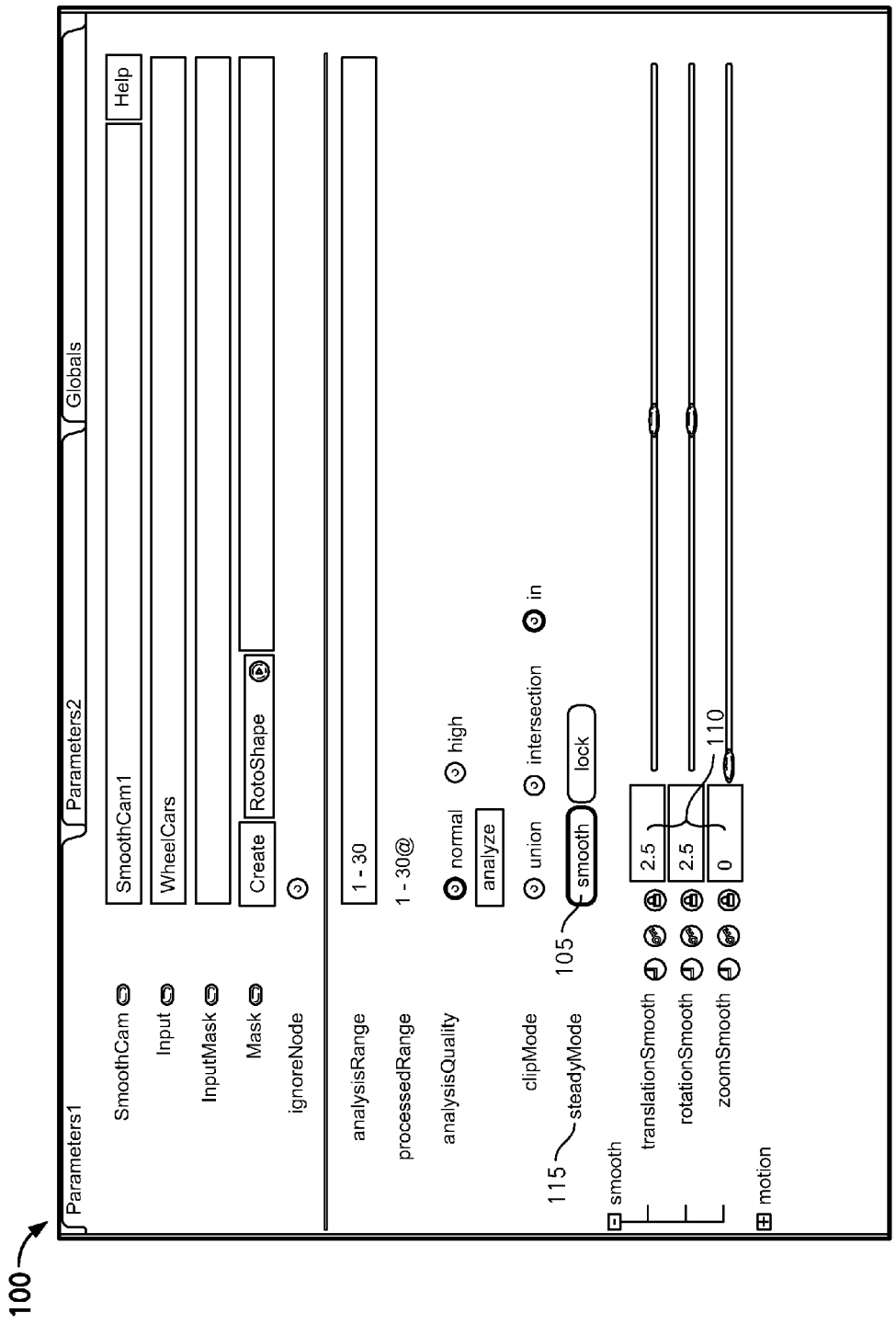
FIG. 1 illustrates a smoothing function selected in the user interface of some embodiments.

The smoothing operation will now be further described by reference to FIGS. 1-7. In these figures, the smoothing operation is part of a video compositing application that allows a video editor to select the smoothing operation for a set of frames that define a video sequence. FIG. 1 illustrates a user interface ("UI") 100 of the video compositing application in some embodiments. As shown in this figure, the UI 100 lists the parameters of the smoothing operation.

Specifically, this UI lists a steady-mode parameter 115 that can be either "smooth" or "lock". In the example illustrated in this figure, the user has selected the "smooth" value 105 for the steady-mode parameter 115, in order to define a smoothing operation. As shown in FIG. 1, the UI 100 further includes a smooth-function menu 110 that opens whenever the user selects the smooth value 105. This menu 110 allows the user to request smoothing of up to three types of camera movements. In this example, the three types of camera movements are the camera translation, rotation, and zoom.

Camera translation corresponds to the motion of the optical view field of the camera in the X and/or Y directions of coordinate space. Camera zoom corresponds to the increase and decrease in the size of objects in the optical view field due to physical or theoretical movement along the Z axis in coordinate space. Camera rotation corresponds to the clockwise and counterclockwise rotation of the view field of the camera about the three-dimensional axes, i.e., the X, Y and Z axes, in coordinate space.

Figure 2:
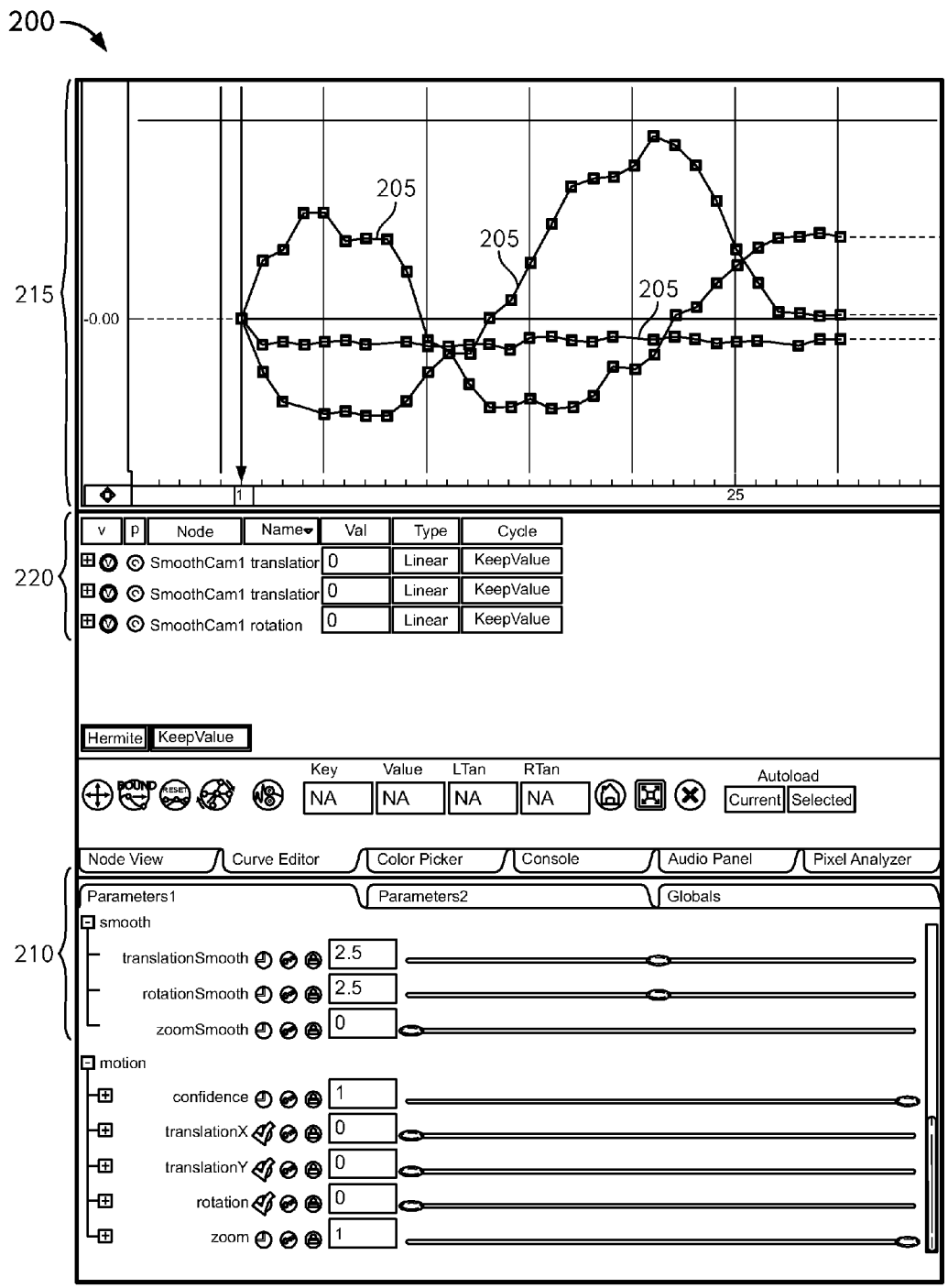
FIG. 2 illustrates curves representing translation, rotation, and zoom extracted from a video sequence.

As mentioned above, the smoothing operation generates a set of curves that represent (i.e., "track") each type of camera motion described above for a given video sequence. FIG. 2 illustrates three curves, where the first curve represents camera translation along the X-direction, the second curve represents camera translation along the Y-direction, and the third curve represents camera rotation about the Z-axis. In this example, however, camera zoom along the Z-direction has not been tracked and no curve has been generated for this type of camera motion.

Some embodiments allow the user to configure the smoothing operation for each camera movement type through a slider 210 that is associated with the movement type, as shown in FIG. 2. Each slider 210 permits the user to configure the smoothing operation to reduce sensitivity or even to ignore one type of motion (e.g., zoom) to improve the tracking and smoothing for the other types of motion. For instance, a user editing a video sequence that includes a rotating Ferris wheel in its content would achieve better smoothing performance for translation and zoom motion by ignoring or greatly minimizing the rotation movements of the substantial number of pixels from the rotating wheel in this video sequence.

The video compositing application performs the smoothing operation once the editor specifies (through the UI tools 105 and 110) the parameters for the smoothing operation for a selected video sequence, and requests the performance of the smoothing operation. In some embodiments, the application's smoothing operation has three stages.

In the first stage, the smoothing operation of some embodiments identifies a set of pixels to track in the selected video sequence. This operation tracks a set of selected camera movements (i.e., one or more camera movements that the editor selected for tracking) with respect to the identified set of pixels. To track the set of camera movements, the smoothing operation (1) defines a mathematical expression that represents the camera motion through the video sequence, where the mathematical expression is based on a motion model, and (2) identifies a solution for the mathematical expression based on the set of pixels.

In the second stage, the smoothing operation of some embodiments performs two sub-operations. Based on the solution identified at the end of the first stage, the first sub-operation generates a curve for each type of motion that the smoothing operation tracks during the first stage. The second sub-operation then smoothes the generated curves by reducing the jagged edges in these curves. In other words, the smoothing operation of some embodiments removes the high frequency fluctuations from the curves. As further described below, the smoothing operation of some embodiments uses a heat diffusion model to smooth the generated curves.

In the third stage, the smoothing operation of some embodiments then uses the difference between the unsmoothed curve set (i.e., the curve set generated by the first sub-operation of the second stage) and the smoothed curve set (i.e., the curve set generated by the second sub-operation of the second stage) to define a set of transforms. This operation then applies the set of transforms to each video image (e.g., frame) in the selected video sequence to remove unwanted camera motion from these images. In other words, the application of the set of transforms to the selected video sequence results in a modified video sequence that has eliminated most or all of the undesired camera movement.

B. First Stage: Estimate Unwanted Motion

In the first stage, the smoothing operation identifies a set of pixels to track in the selected video sequence. This operation tracks a set of selected camera movements (i.e., one or more camera movements that the editor selected for tracking) with respect to the identified set of pixels. To track the set of camera movements, the smoothing operation (1) defines a mathematical expression that represents the camera motion through the video sequence, where the mathematical expression is based on a motion model, and (2) identifies a solution for the mathematical expression based on the set of pixels.

As further described below, the motion analysis of the first stage eliminates or reduces the influence of "outlier" pixels in the set of pixels that interfere with the motion analysis. Such outlier pixels have motion that if accounted for in the analysis would interfere with the motion analysis. In other words, the motion of these outlier pixels differs significantly from the motion of the other pixels in the selected pixel set. This differing motion might be due to the fact that the outlier pixels are part of objects that are moving in the scene(s) capture by the video sequence (i.e., of objects that have a desired movement in the sequence and that are not due to undesired camera movement). Outlier pixels might also be due to illumination changes. Previous video editing tools in the art assumed fixed lighting conditions. However, new cameras have automatic exposure and other features that affect the parameter values, such as illumination or lighting.

Thus, the first stage of some embodiments for motion estimation is robust, meaning that these embodiments distinguish the unwanted camera motion from the desired underlying camera motion in the video sequence, and from moving objects and illumination changes in the video sequence. Further, some embodiments provide for additional robust features. For instance, some embodiments perform motion analysis automatically and do not require the user to specify any tracking points (e.g., these embodiments automatically select a set of pixels for tracking). Also, some embodiments allow the user to specify mask regions in order to exclude certain image areas from the motion estimation. In addition, some embodiments further allow the user to specify the sensitivity for tracking and smoothing each type of motion, as mentioned above.

1. Pixel Selection

As mentioned above, the smoothing operation of some embodiments automatically selects a set of pixels to track for their movement in the video sequence. The motion of the pixels in a video sequence can be divided into two categories (1) the motion of objects in the video sequence and (2) the motion of the camera.

As mentioned above, camera motion includes any desirable underlying smooth motion (e.g., panning, zooming, etc.) as well as any undesirable camera motion. Both undesirable and desirable camera motion result in translation, rotation, and zoom in the optical field view of recording. The desirable camera motion may be referred to below as underlying motion and the desirable motion of an object in the content of a scene may be referred to as content motion. Some embodiments retain the desirable content motion and the underlying smooth camera motion while removing the undesirable camera motion from the video sequence.

The pixels that are selected for tracking are pixels that might be of interest in the frames of the video sequence. Not all parts of each image contain useful and complete motion information. Thus, these embodiments select only those pixels in the image with high spatial frequency content. Pixels that have high spatial frequency content include pixels from corners or edges of objects in the image as opposed to pixels from a static monochrome, or white, background. Selecting only pixels with high spatial frequency content (i.e., useful for performing motion estimation), optimizes a pixel correspondence process that will be described next. Some embodiments can select a different set of pixels for the motion analysis of each pair of successive frames.

2. Defining Constraints

In order to track the correspondence and motion of pixels between frames, some embodiments for each pair of successive frames, define (1) a motion function that expresses the motion between the successive frames, (2) define an objective function based on this motion function, and (3) a set of constraints for finding an optimal solution to the objective function. The defining of the motion and objective functions will be described further in the next sub-section.

To define a set of constraints, some embodiments use the classical optical flow constraint equation:

$$\text{frame}_x * u + \text{frame}_y * v + \text{frame}_t = 0 \quad \text{(equation 1)}$$

where (u,v) are unknown components of the flow, and subscripts x, y, and t indicate differentiation.

By using the optical flow constraint equation to collect constraints of neighboring points and solve the resulting overconstrained set of linear equations, some embodiments exploit the information from a small neighborhood around the examined pixel to determine pixel correspondence and motion between frames. The set of pixels applied to the constraint equations was selected for each pixel's optimum motion estimation properties by the pixel classification process above. Thus, the selected set of optimal pixels avoids the classical ill-condition drawback that typically arises when using local motion estimation techniques. The correspondence process generates a motion flow to represent the flow field between each pair of successive frames in the video sequence.

3. Motion Model Estimation Process

For each pair of successive frames, some embodiments (1) define a motion function that expresses the motion between the successive frames, and (2) based on the motion function, define an objective function that expresses the difference between the two successive frames. For each objective function, these embodiments then try to find an optimal solution that will fit the flow-field constraints defined for that function.

In some embodiments, the motion function that expresses the motion between two frames X and Y, can be expressed as:

$$M(X) = Mo(X) * Pa \quad \text{(equation 2)}$$

Here, $M(X)$ is the function that expresses the motion between the frames X and Y, $Mo(X)$ is the motion model used for expressing the motion between the two frames in the video sequence, and Pa represents the set of parameters for the motion model, which, when defined, define the motion function $M(X)$. In other words, the motion model $Mo(X)$ is a generic model that can be used to represent a variety of motions between two frames. Equation 2 is optimized in some embodiments to identify an optimal solution that provides the values of the parameter set Pa, which, when applied to the motion model, defines the motion function $M(X)$.

In some embodiments, the motion model $Mo(X)$ can be represented by an m-by-n matrix, where m is the number of dimensions and n is the number of coefficients for the polynomial. One instance of the matrix $Mo(x)$ and the vector Pa are given below:

$$Mo(X) = \begin{pmatrix} 1 & x & y & 0 & 0 & 0 & x^2 & xy & y^2 & 0 & 0 & 0 \\ 0 & 0 & 0 & 1 & x & y & 0 & 0 & 0 & x^2 & xy & y^2 \end{pmatrix}$$

$$Pa = \begin{pmatrix} a1 \\ a2 \\ a3 \\ a4 \\ a5 \\ a6 \\ a7 \\ a8 \\ a9 \\ a10 \\ a11 \\ a12 \end{pmatrix}$$

In the example above, the motion model has two rows to indicate motion in the x-axis and motion in the y-axis.

As illustrated above, some embodiments may base the parametric motion model on a two dimensional polynomial equation represented by a two-by-twelve matrix and twelve corresponding vector coefficients. These embodiments provide the advantage of accurate motion model estimation within a reasonable computation time. The motion estimation model of other embodiments may be based on different (e.g., multi) dimensional polynomial equations. However, one of ordinary skill will recognize that polynomials having additional dimensions may require tradeoffs such as increased processing time.

Some embodiments use the motion function defined for each particular pair of successive frame to define an objective function for the particular pair of frames. The objective function is a sum of the difference in the location of the identified set of pixels between the two frames after one of them has been motion compensated based on the motion function. This objective function expresses an error between a motion-compensation frame (M(X)) in the pair and the other frame (Y) in the pair. By minimizing this residual-error objective function, some embodiments identify a set of parameters Pa that best expresses the motion between frames X and Y. Through the proper selection of the set of pixels that are analyzed and the reduction of the set of pixels that adversely affect the optimization of the objective function, some embodiments reduce the consideration of content motion between the pair of frames.

Equation 3 illustrates an example of the objective function R of some embodiments, which is a weighted sum of the difference between each pair of corresponding pixels ($P_{Y,i}$, $P_{X,i}$) in a pair of successive frames after one pixel ($P_{X,i}$) in the pair has been motion compensated by using its corresponding motion function.

$$R = \sum_{i=1}^{Num\_P} (C_i * E_i), \qquad \text{(equation 3)}$$

where $E_i = (P_{Y,i} - (Mo(P_{X,i}) * Pa))^2$

In this equation, i is a number that identifies a particular pixel, Num_P is the number of pixels in the set of pixels being examined, and $C_i$ is a weighting factor used to value the importance of the particular pixel i in the motion analysis.

Some embodiments try to optimize the objective function of Equation (3) through two levels of iterations. In the first level of iterations, the smoothing operation explores various different possible camera movements (i.e., various different sets of parameter values Pa) to try to identify a set of parameter values that minimize the objective function R, while meeting the set of defined optical flow constraints.

In the second level of iterations, the smoothing operation changes one or more weighting factors $C_i$ and then repeats the first level of iterations for the new weighting factions. The second level of iterations are performed to reduce the affect of outlier pixels that improperly interfere with the optimization of the objective function R. In other words, the first level of iterations are a first optimization loop that is embedded in a second optimization loop, which is the second level of iterations.

For its second level of iterations, the smoothing operation use a weighted least squares fit approach to adjust the weighted coefficients Ci. In some embodiments, the weights of all coefficients initially have a value of one, and are re-adjusted with each iteration pursuant to the adjustments illustrated in Equation 4 below.

$$\text{if } (Ei < 1) \qquad \text{(equation 4)}$$
$$Ci = \frac{(1 - Ei^2)^2}{Ei}$$
$$\text{else}$$
$$Ci = 0$$

The motion model estimation process of these embodiments accepts or rejects each pixel based on its error (i.e., its parametric motion estimation) by adjusting the error coefficient weightings over the course of several iterations. The motion estimation process ends its iterative optimization process when the desired residual error R is reached or after a predetermined number of iterations. The iterative nature of the motion model estimation process and the accurate estimation of the error coefficients ($C_i$) allow the process to accurately estimate the unwanted motion of pixels between images even in the presence of outlier points that deviate significantly in the error distribution (e.g., even in the presence of object motion in the video sequence).

Figure 4:
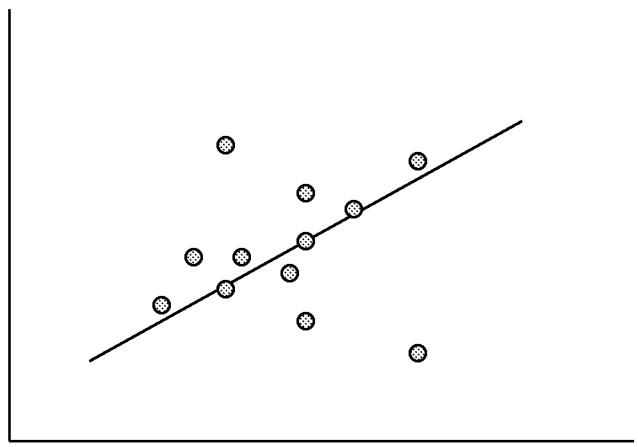
FIG. 4 illustrates an error distribution with outliers.

For instance, FIG. 4 illustrates the concept behind a weighted least square fit approach to eliminating outliers from a set of analysis point. In this distribution, the majority of the analysis pixels group approximately along the least square fit line 405, while some analysis pixels are far from this line, and these pixels are the outliers pixels (e.g., pixels associated with content motion between the two frames). FIG. 4 is only a conceptual illustration, as the least squares fit analysis is performed on more than one dimensions (e.g., on twelve dimensions associated with the twelve parameter values).

C. Second Stage: Generating Curves

In the second stage, the smoothing operation of some embodiments performs two sub-operations. Based on the solution identified at the end of the first stage, the first sub-operation generates a curve for each type of motion that the smoothing operation tracks during the first stage. The second sub-operation then smoothes the generated curves by reducing the jagged edges in these curves. In other words, the smoothing operation of some embodiments removes the high frequency fluctuations from the curves. As further described below, the smoothing operation of some embodiments uses a heat diffusion model to smooth the generated curves.

1. First Sub-Operation: Curves for Camera Motion

For each pair of successive frames, the first sub-operation generates a curve for each type of motion that the smoothing operation tracks during the first stage. This sub-operation generates the curve for each motion type between each pair of successive frames based on the motion parameter vaules Pa that the smoothing operation identified for the pair of successive frames during its first stage.

Some embodiments extract particular parameters from the parametric motion model for each particular type of motion along each dimension. For instance, one embodiment extracts the following parameters to model each type of movement listed below:

rotation angle, $Ao=a2/a6$;

translation along $X$, $Txo=a1$;

translation along $Y$, $Tyo=a4$; and zoom along $Z$, $Zo=0.5*(a2+a4)$. (equation 5)

As illustrated above, the parameters extracted in these embodiments can be combined by using a variety of logical and/or mathematical operations to represent one or more parametric changes that occur during each type of movement between the video image frames. One of ordinary skill will recognize that other embodiments may extract different sets of parameters from the motion model, and that these sets of parameters could be combined with different operators to estimate the motion differently.

2. Second Sub-Operation: Smoothed Curves for Camera Motion

The combination of the parameters and operations results in linear functional expressions, e.g. curves. Once the parameters for the particular range of motion are extracted from the motion model and assembled into curves, some embodiments apply a smoothing formula to each parametric curve to achieve a smoothing effect for the images between frames. Some embodiments perform the smoothing automatically, while some embodiments allow the user to adjust the curves and smoothing manually. These embodiments may provide these capabilities along with a graphical representation of the curves in a curve editor, as illustrated in FIG. 2. As mentioned, this figure illustrates a user interface 200 of some embodiments having control tools 210 and 215 that may be used to modify one or more curves 205 presented in curve editor section 220.

The smoothing operation of some embodiments uses a heat diffusion model to smooth the generated curves. In other words, some embodiments accomplish smoothing of the extracted curves (which might represent camera translation, rotation, zoom, etc.), by a novel application of conduction theory. In conduction theory, heat (i.e., energy) may be represented by a graph that illustrates the distribution of heat among continuous points. According to this theory, the energy of a point is diffused over time through diffusion or distribution through the point's neighbors. Similarly, the motion (i.e., energy) of pixels may be represented by continuous points in a graph that resembles the distribution of motion energy among the various points. The unwanted motion of each pixel may be diffused through its neighbors by using a motion diffusion formula similar to the classical conduction principles. The classical conduction formula is:

$$\frac{\partial T}{\partial t} = \kappa \nabla^2 T. \quad \text{(equation 6)}$$

In this formula, T is typically the temperature of a substrate; and k is the diffusion rate of temperature as used in this equation. Modification of the conduction formula for a distribution of unwanted or high frequency camera motion yields a motion diffusion implementation in some embodiments. For instance, some embodiments implement the heat diffusion smoothing for motion diffusion through the discreet Laplacian operator used in geometric signal processing. These embodiments perform convolution on the extracted curve C with L=[1, −4, 1], and perform the smoothing by repeatedly summing the curve C and its Laplacian. At each iteration:

$$Cn = Cn-1 + D*L**Cn-1, \quad \text{(equation 7)}$$

The diffusion coefficient D is a parameter that represents the amount of smoothing applied to the curve C and "**" denotes the convolution operator. In these embodiments, the diffusion coefficient D is analogous to the parameter k in the classical formula, and controls the rate of diffusion for the motion diffusion implementation. Thus, some embodiments allow modification of the coefficient D to adjust the amount of movement removed from the video sequence and the amount of smoothing that will be performed. Some embodiments apply this motion diffusion implementation to the extracted curves (which may represent camera translation, rotation, zoom, etc.). As described above, these embodiments remove high frequency camera fluctuations from the curves, without affecting the underlying desirable camera motion from the video sequence by distributing the motion of high energy points to its neighbors.

Figure 5:
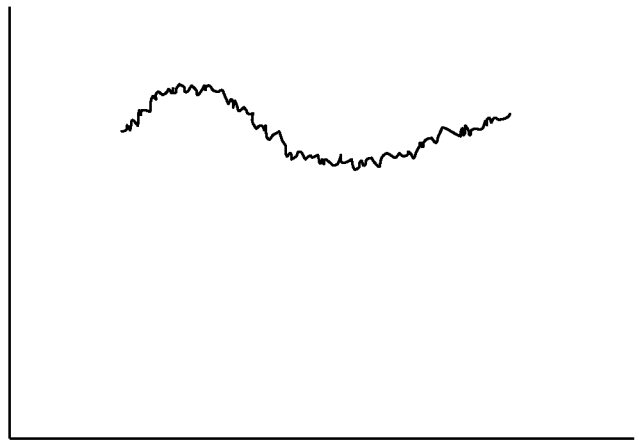
FIG. 5 illustrates an unsmoothed curve.
Figure 6:
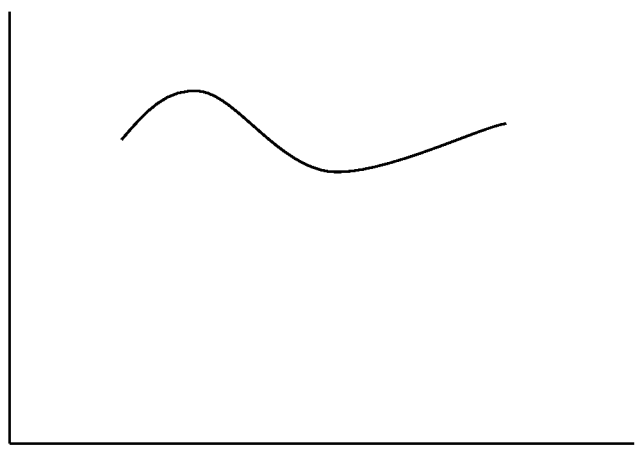
FIG. 6 illustrates the smooth derived curve that approximates the unsmoothed curve.

For instance, FIG. 5 illustrates one instance of an unsmoothed curve extracted for one type of camera motion in a video sequence. The jagged shape of the curve illustrates the jitter in the recorded frames. In other words, the jagged curve 500 reflects high frequency fluctuations of the image in the video frames. Some embodiments apply the motion diffusion formula to the jagged curve 500 to distribute the motion energy at each point to its nearest neighbors. The result yields a smoother curve particularly for the high frequency points. By application of the motion diffusion implementation described above to the jagged curve 500, some embodiments can derive one or more underlying smooth curves from the jagged curve 500. FIG. 6 illustrates the derived smooth curve 605. The smooth curve 605 may represent the underlying intended motion of the camera work used to record the video sequence. This camera work may include intentional camera panning, zooming, rotation, etc., that is typically the result of methodical movement as represented by the smoothness of the derived curve 605.

Thus, the motion distribution implementation of some embodiments has two particularly noteworthy advantages: (1) it distributes the motion energy in the derived curve, and (2) it adheres closely to the low frequency underlying curve, and thus retains the low frequency motion information. Next, some embodiments employ the motion distribution data obtained above while smoothing the parametric curves to compensate for the unwanted motion between frames in the third stage.

D. Third Stage: Application

In the third stage, the smoothing operation of some embodiments then uses the difference between the unsmoothed curve set (i.e., the curve set generated by the first sub-operation of the second stage) and the smoothed curve set (i.e., the curve set generated by the second sub-operation of the second stage) to define a set of compensation transforms. This operation then applies the set of transforms to each video image (e.g., frame) in the selected video sequence to remove unwanted camera motion from these images. In other words, the application of the set of transforms to the selected video sequence results in a modified video sequence that has eliminated most or all of the undesired camera movement.

The compensation transform of some embodiments applies projective homography to generate a four point projective transformation. As mentioned above, some embodiments estimate, by using an iterative weighted least square algorithm, the parameters of a novel motion model based on a polynomial. By using a parametric polynomial model and a weighted least square fit technique, the method generates an affine projective transformation that is robust.

Some embodiments apply the projective transformation to each image to "warp" each image in the video sequence. Each transformed image compensates for some of the unwanted motion between each frame in the video sequence of images. Once these embodiments apply the compensation transform to each frame in the video sequence, the transformed images are recombined to yield a smooth video sequence of transformed images. The following are some examples of compensation transforms that remove unwanted motion from the video sequence images:

rotation compensation for an angle A about an axis=$A_s$-$A_o$;
translation compensation along X direction=$Tx_s$-$Tx_o$
translation compensation along Y direction=$Ty_s$-$Ty_o$
zoom compensation along Z direction=$Z_s/Z_o$ where "s" designates smooth, and "o" designates original.

E. Summary of Three Stages for Smoothing

Figure 3:
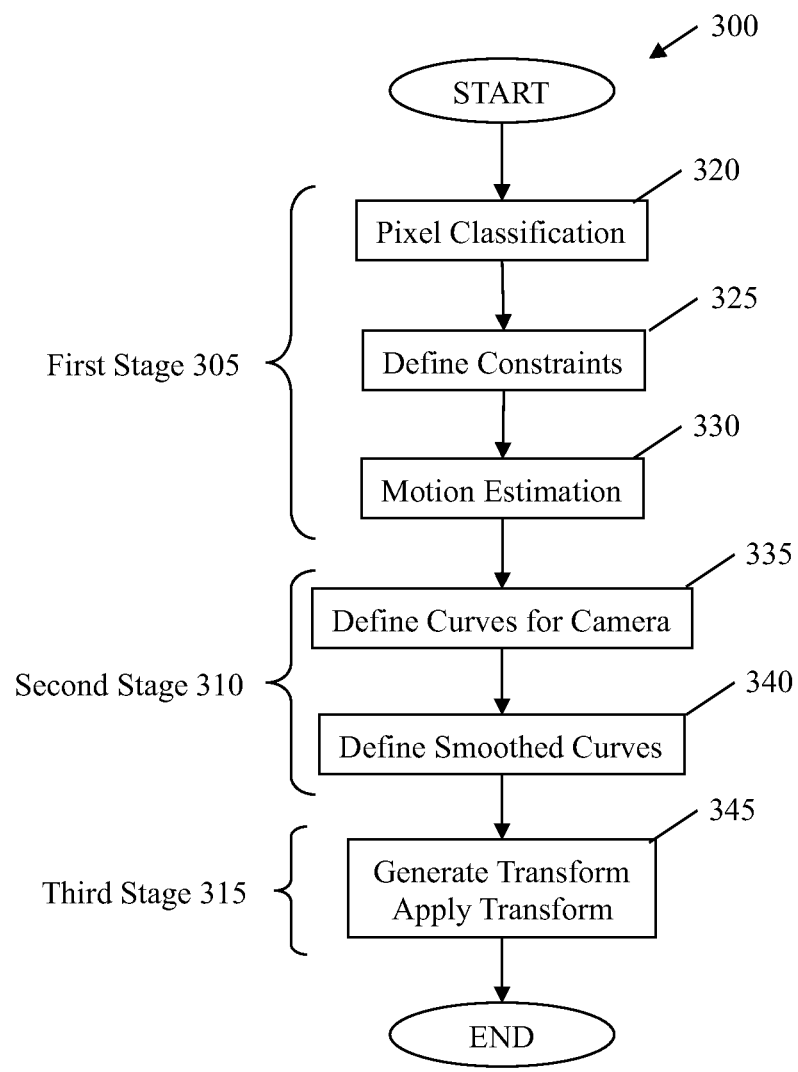
FIG. 3 illustrates a smoothing function process flow.

FIG. 3 illustrates the three stages 305, 310, and 315 of a smoothing process 300 of some embodiments. As shown in this figure, the smoothing process 300 has three stages. In the first stage 305, the process 300 identifies (at 320) a set of pixels to track in the selected video sequence. Next, at 325, the process defines a set of constraints for the identified set of pixels.

To track the set of camera movements between each two successive frames, the smoothing operation (at 330) (1) defines a mathematical expression that represents the set of camera movements, where the mathematical expression is based on a motion model, and (2) identifies a solution for the mathematical expression based on the set of pixels.

After 330, the process enters its second stage 310. During this stage, the smoothing process of some embodiments generates (at 335) a curve for each type of motion that the smoothing operation tracks during the first stage, based on the solution identified at the end of the first stage. Next, at 340, the process 300 generates a smoothed set of curves from the first set of curves generated at 335 by reducing the jagged edges in the first set of curves.

After 340, the smoothing process 300 enters its third stage 315. During this stage, the smoothing operation of uses (at 345) the difference between the unsmoothed curve set (i.e., the curve set generated by the first sub-operation of the second stage) and the smoothed curve set (i.e., the curve set generated by the second sub-operation of the second stage) to define a set of transforms. This operation then applies (at 345) the set of transforms to each video frame in the selected video sequence to remove unwanted camera motion from these frames. In other words, the application of the set of transforms to the selected video sequence results in a modified video sequence that has eliminated most or all of the undesired camera movement.

F. Example of Smoothing

Figure 7:
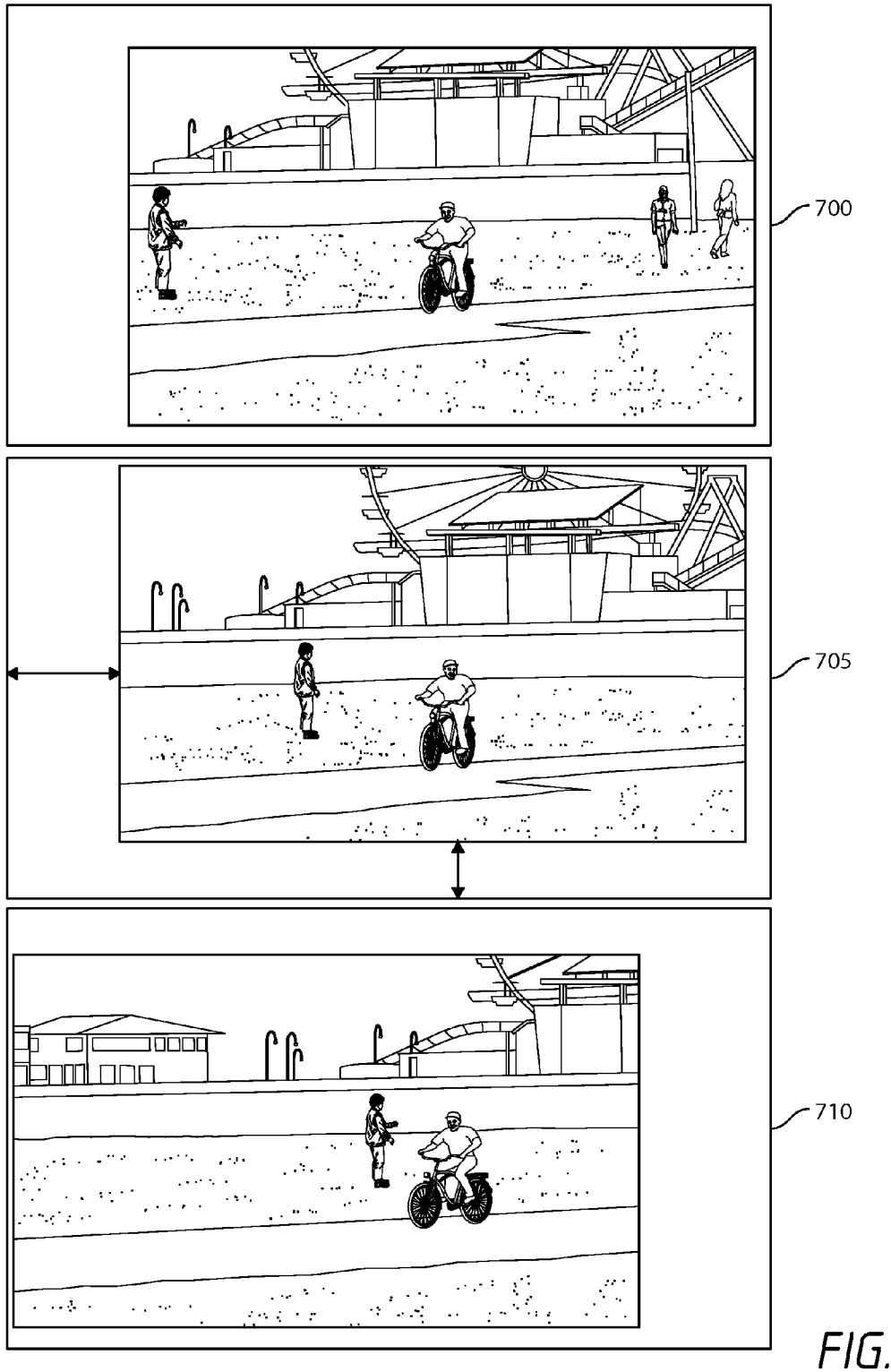
FIG. 7 illustrates a smoothed video sequence of image frames.

FIG. 7 illustrates three frames 705, 710, and 715 in a video sequence of images that may benefit from the smoothing operation of some embodiments. As shown in this figure, the video sequence contains content motion in the form of one or more objects moving in the scene (e.g., the man riding the bicycle from right to left, the person walking from left to right, and the Ferris wheel in the background possibly rotating). However, the smooth motion of the camera (e.g., translation along the X-direction likely due to panning) has been tracked, without interference from the content motion. The tracked camera motion includes unwanted jitter (e.g., translation along the Y-direction likely due to unintended vertical camera fluctuations). In this figure, motion tracking is evidenced by the inconstant dimensions of the black frame bordering each image of the video sequence.

In some embodiments, the black frame includes the union of the field of view of all images in the video sequence, while exclusion of the black frame leaves only the input image size ("in") of the original video sequence. As shown in FIG. 1, some embodiments, allow the user to select the type of smoothed output by using a "clipMode" selection. In these embodiments, the selection of the "intersection" clipMode results in the highest quality smoothing effect, but at the tradeoff reduced image size, since the output of this selection is limited to the intersection of all the smoothed images in the video sequence.

II. View Field Locking

The video editing application of some embodiments provides for a lock operation that locks the field of view for a video sequence to the field of view of an image in the sequence. Specifically, in some embodiments, the lock operation is applied to a video sequence by defining a video image in the sequence as the image that defines the locked field of view. The locking operation then defines a transform for each other image in the sequence that moves (e.g., through translation, rotation, zooming, etc.) the field of view of the other image to match the locked field of view.

After performing this locking operation, the video editor can then add one or more objects to the video sequence that are at locations that remains constant to one or more previously defined objects in the video sequence. The added object(s) can be defined for some or all the images (e.g., frames) in the video sequence. In some embodiments, the video editing application allows the video editor to unlock a set of images in the video sequence, after locking them and adding objects to them. The added objects then maintain their constant positions to the previously defined object in the video images, even though the video images might no longer have a constant field of view. In other words, the added fixed object will appear in the video sequence with any original camera motion (such as panning, rotation, zooming, etc.) taken into account.

Optical view field locking generates a transform that represents the conversion of the original video sequence to a locked video sequence. The transform is based on the selected type of view field locking. Some embodiments allow four types of view field locks, camera translation, rotation, and zoom locks, and a perspective lock. Some embodiments further provide for an inverse lock operation. These embodiments allow the effect of the lock operation on the video sequence to be reversed.

Figure 8:
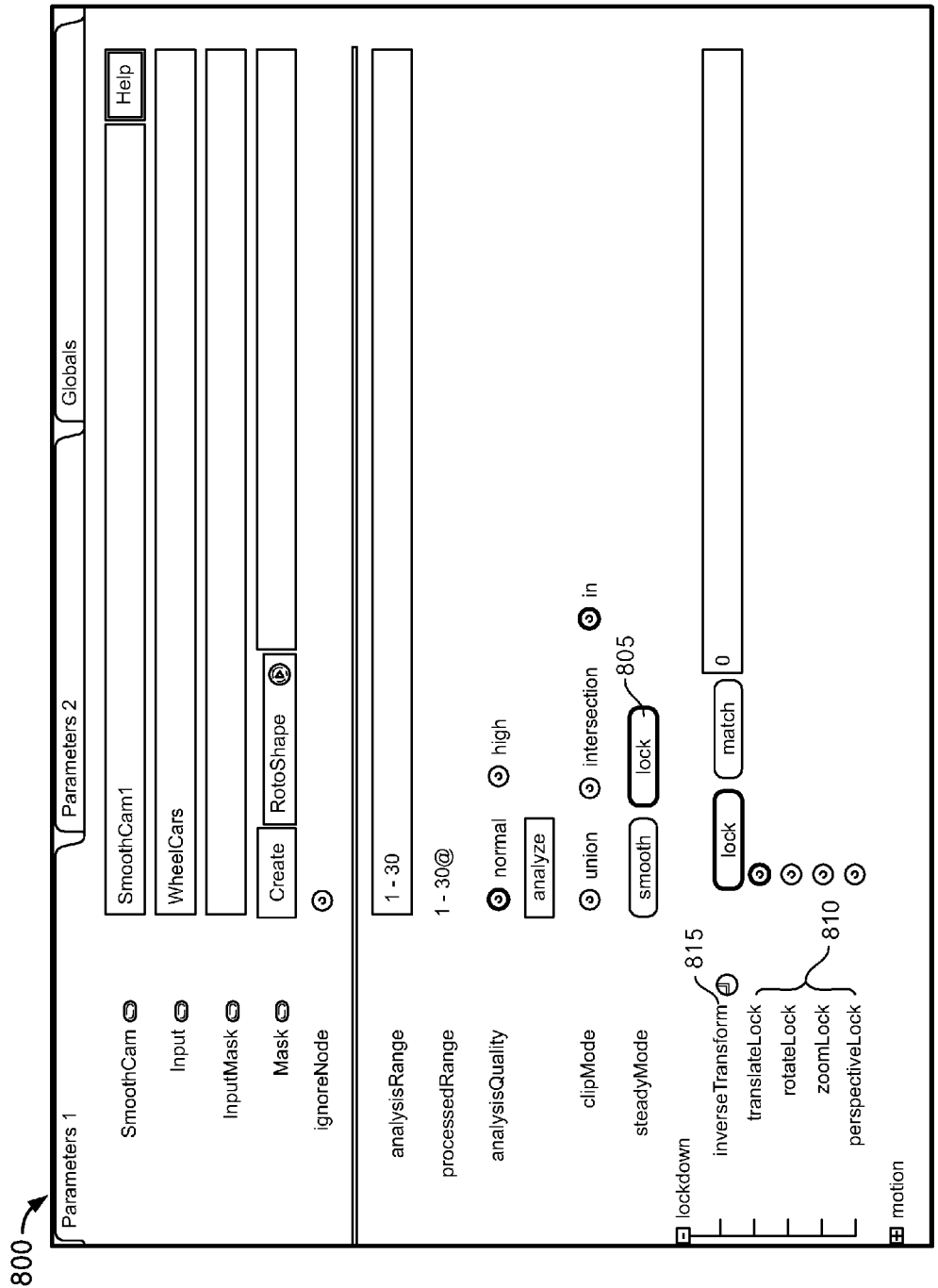
FIG. 8 illustrates a lock operation selected in the user interface of some embodiments.

For instance, FIG. 8 illustrates the selection of lock operation 805 in the steady mode option of the user interface of some embodiments. As shown in FIG. 8, the lock operation 805 allows locking of three types of camera motion, translate lock, rotate lock, zoom lock, and a fourth type of lock, perspective lock 810. Also shown in this figure, the inverse transform for each type of lock can be obtained by selecting the inverse transform button 810.

Figure 9:
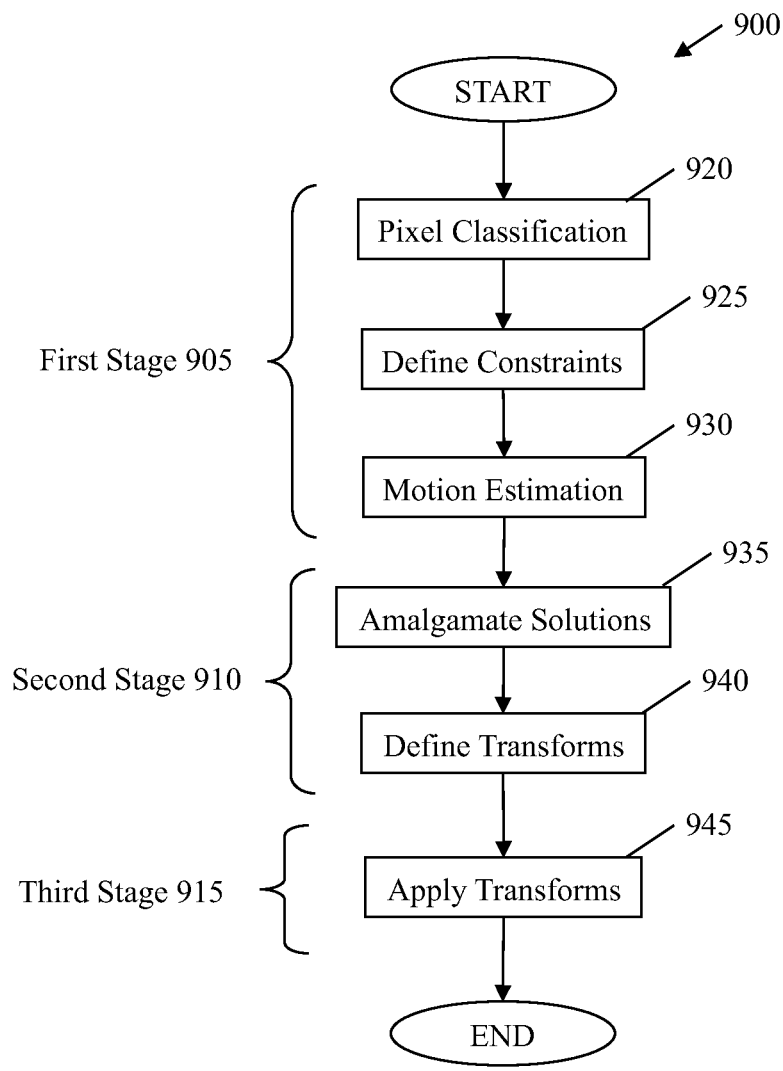
FIG. 9 illustrates a lock operation process flow.

FIG. 9 illustrates the locking process 900 of some embodiments. This locking process locks the optical field of view for a set of frames to the field of view of a particular frame (i.e., a reference frame) in the set. As shown in this figure, the first couple of operations of the locking process 900 is similar to the first couple of operations of the smoothing process 300. This is because some embodiments provide for the various types of field view locks (e.g., translation, rotation, zoom, and perspective) in a manner that is similar to the smoothing operation described above.

As shown in FIG. 9, the lock operation performs the first stage of the smoothing operation for each successive pairs of frames in the video sequence. Specifically, for each successive pair, the locking operation first identifies (at 920) a set of pixels to track. Next, for each successive pair, the process defines (at 925) a set of constraints for the identified set of pixels.

To track the set of camera movement between each two successive frames, the locking operation (at 930) (1) defines a mathematical expression that represents the camera motion, where the mathematical expression is based on a motion model, and (2) identifies a solution for the mathematical expression based on the set of pixels (i.e., identifies a set of motion value parameters Pa that specify the motion between the two frames).

After 930, the process enters its second stage 910. For each particular frame that is not adjacent to the reference frame that is used to lock the field of view, the locking process generates (at 935) an amalgamated set of motion value parameters Pam that specify the motion between the particular frame and the reference frame. The amalgamated set of motion value parameters Pam is generated by amalgamating all the sets of motion value parameters that are defined for each pair of frames between the particular frame and the reference frame.

At 940, the process then uses the sets of motion value parameters to define transforms for each non-reference frame in the sequence that are to be used to move (e.g., through translation, rotation, zooming, etc.) the field of view of the non-reference frames to match the locked field of view of the reference frame. The transforms for the frames that neighbor the reference frame are based on the set of parameter values identified at 930, while the transforms for the non-neighboring frames are based on the amalgamated set of parameter values identified at 935.

Equation 9 provides an example of how some embodiments compute the motion transforms.

$$\text{Rotation Angle (for Locking) at Frame } N: A_{lock} = \sum_i^N A_i;$$

$$\text{Translation along } X \text{ at Frame } N: Tx_{lock} = \sum_i^N Tx_i;$$

$$\text{Translation along } Y \text{ at Frame } N: Ty_{lock} = \sum_i^N Ty_i;$$

$$\text{Zoom at Frame } N: Z_{lock} = 1.0/\text{product\_of } (Z_i);$$

(equation 9)

Here, $A_i$, $Tx_i$, $Ty_i$ and $Z_i$ represent respectively the Angle, Translation along X, Translation along Y and Zoom between frame(i) and frame(i−1), which were defined above in Equation 5, and i ranges from 0 to N, N being the number of frames in the video sequence.

At 945, the process then applies the set of transforms to each video frame in the selected video sequence to lock the field of view.

View field locking allows many useful features. For instance, a perspective lock may be applied to a video sequence. Then, a fixed object may be included (i.e., composited) with a frame in the perspective locked video sequence. By applying the inverse of the transform used to lock the video sequence, some embodiments allow the transformed video sequence to return to the original video sequence with the fixed object inserted each frame. Moreover, the object is adjusted for the unlocked motion in each frame of the original video sequence by using the inverse of the locking transform.

Figure 10:
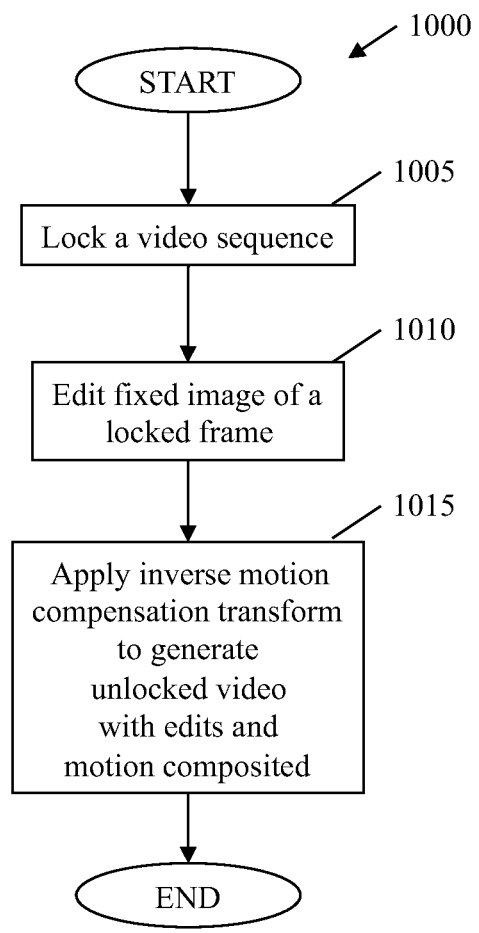
FIG. 10 illustrates performing an inverse operation.

FIG. 10 illustrates a compositing process 1000 that some embodiments may use to apply the view field locking functionality described above. As shown in the figure, the process 1000 begins at 1005 by locking a video sequence that is currently being edited. Then the process 1000 transitions to 1010, where the process edits a frame of the locked video sequence. A variety of compositing effects and/or video editing functions may be performed at 1010. For instance, a fixed object may be added to the background the frame. In this instance, a frame will be selected where the entirety of the fixed object can appear, as will be illustrated further in relation to FIG. 7 below. Once the video editing effects are performed at 1010, the process 1000 transitions to 1015. At 1015, the process 1000 applies the inverse of the locking transform to the edited video image to unlock the video sequence of images and incorporate the video editing effects in the unlocked sequence. Then, the process 1000 concludes.

Figure 11:
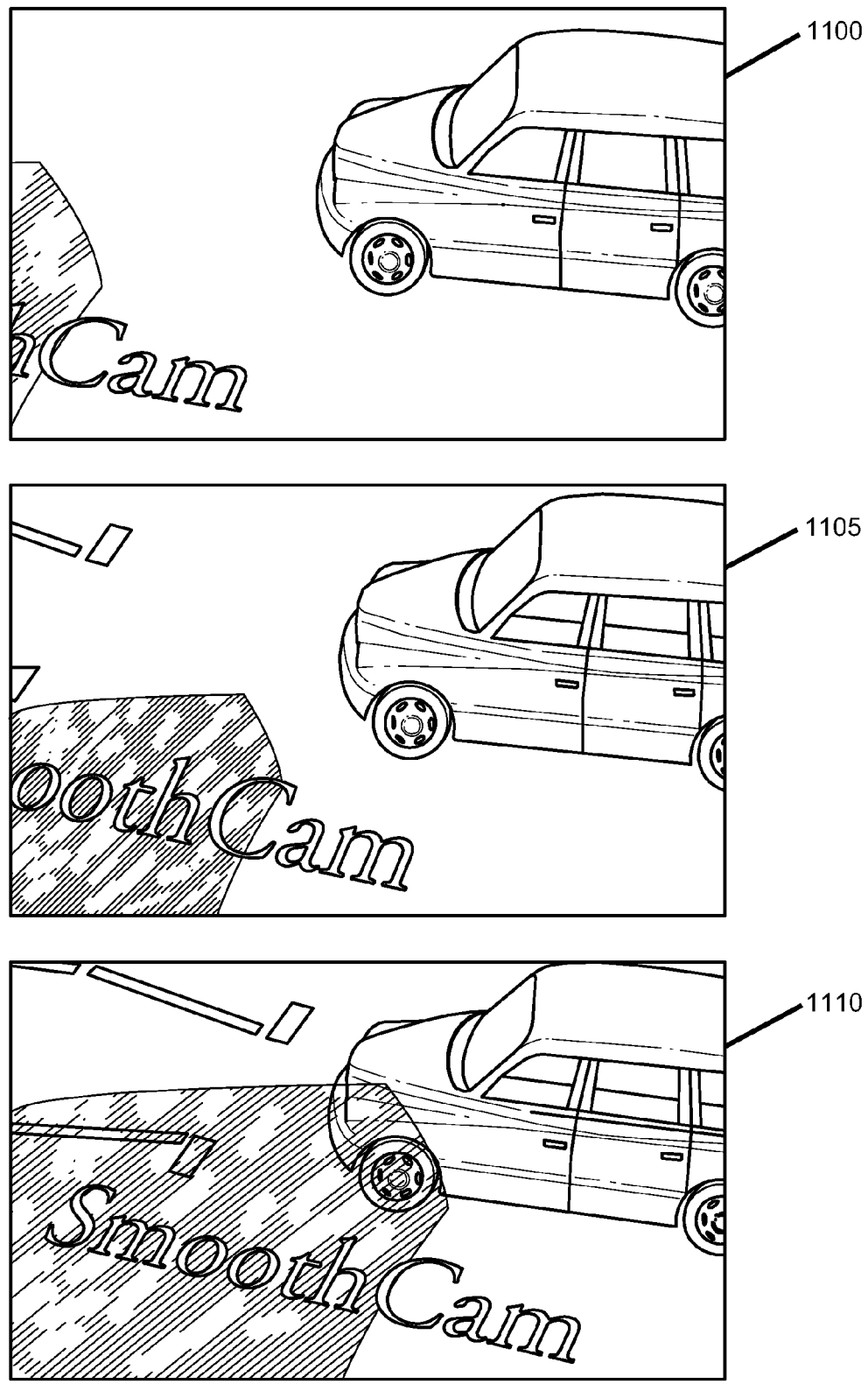
FIG. 11 illustrates a locked video sequence of image frames.

For instance, FIG. 11 illustrates three frames 700, 705, and 710 that contain content object motion in the form of a vehicle moving from right to left on a fixed pavement surface. As shown in this figure, a user has locked the video sequence (e.g., by using the perspective lock described above) and edited one image frame 810 to include the text "SmoothCam" on the pavement of this image. Also shown in this figure, the camera has tracked the motion of the vehicle from right to left through the scene. Thus, the vehicle appears roughly constant throughout the each field of view whereas the background pans in relation to the vehicle. This might present difficulty, however, the user has applied the inverse of the locking transform to integrate the text into each image frame of the sequence. One of ordinary skill will recognize that additional embodiments may similarly achieve a variety of compositing effects.

III. Computer System

Figure 12:
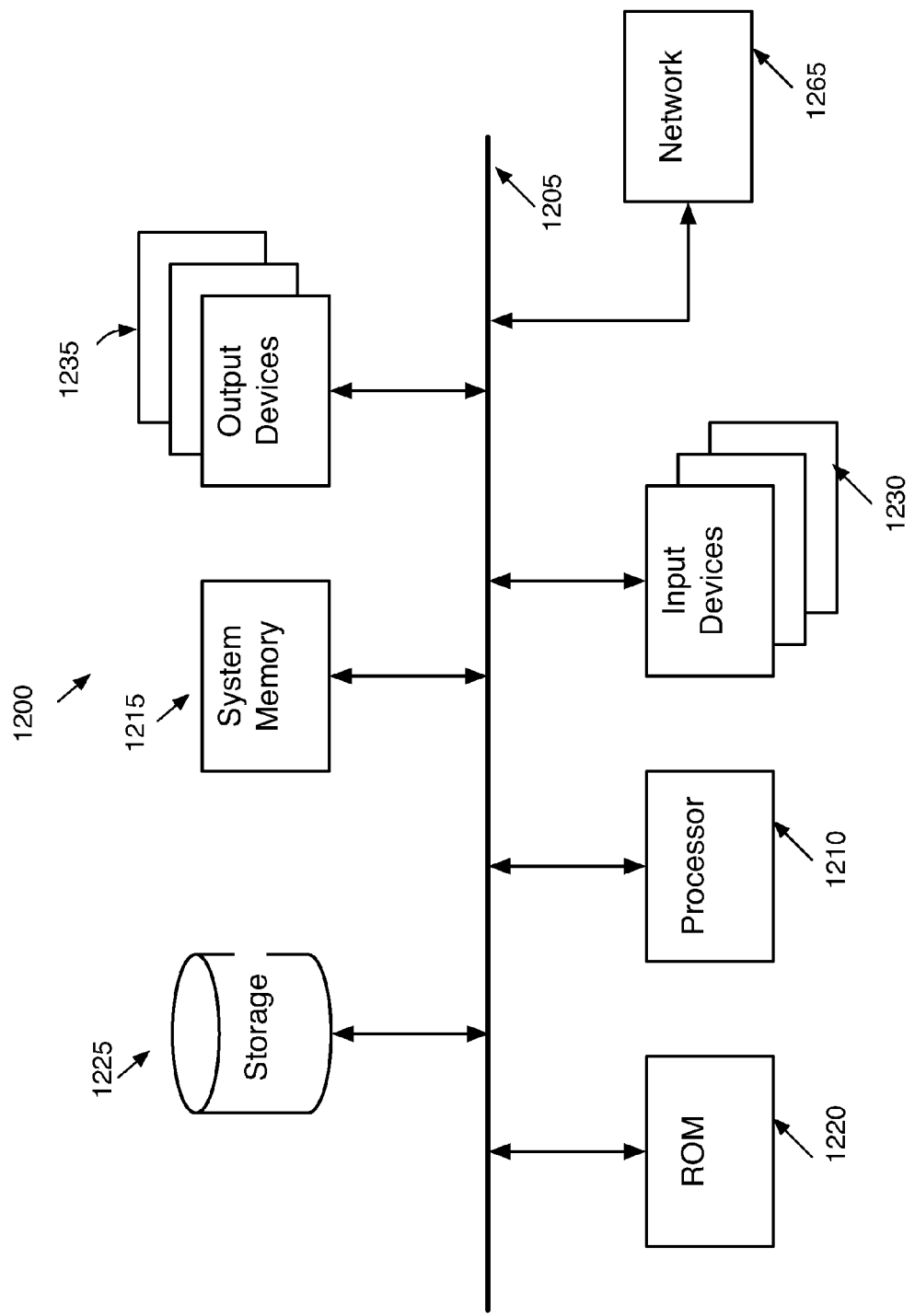
FIG. 12 conceptually illustrates a computer system that can be used to implement the invention.

FIG. 12 conceptually illustrates a computer system with which one embodiment of the invention is implemented. Computer system 1200 includes a bus 1205, a processor 1210, a system memory 1215, a read-only memory 1220, a permanent storage device 1225, input devices 1230, and output devices 1235. The bus 1205 collectively represents all system, peripheral, and chipset buses that communicatively connect the numerous internal devices of the computer system 1200. For instance, the bus 1205 communicatively connects the processor 1210 with the read-only memory 1220, the system memory 1215, and the permanent storage device 1225.

From these various memory units, the processor 1210 retrieves instructions to execute and data to process in order to execute the processes of the invention. The read-onlymemory (ROM) 1220 stores static data and instructions that are needed by the processor 1210 and other modules of the computer system.

The permanent storage device 1225, on the other hand, is read-and-write memory device. This device is a non-volatile memory unit that stores instruction and data even when the computer system 1200 is off. Some embodiments of the invention use a mass-storage device (such as a magnetic or optical disk and its corresponding disk drive) as the permanent storage device 1225.

Other embodiments use a removable storage device (such as a floppy disk or Zip® disk, and its corresponding disk drive) as the permanent storage device. Like the permanent storage device 1225, the system memory 1215 is a read-and-write memory device. However, unlike storage device 1225, the system memory is a volatile read-and-write memory, such as a random access memory. The system memory stores some of the instructions and data that the processor needs at runtime. In some embodiments, the invention's processes are stored in the system memory 1215, the permanent storage device 1225, and/or the read-only memory 1220.

The bus 1205 also connects to the input and output devices 1230 and 1235. The input devices enable the user to communicate information and select commands to the computer system. The input devices 1230 include alphanumeric keyboards and cursor-controllers. The output devices 1235 display images generated by the computer system. For instance, these devices display the GUI of a video editing application that incorporates the invention. The output devices include printers and display devices, such as cathode ray tubes (CRT) or liquid crystal displays (LCD).

Finally, as shown in FIG. 12, bus 1205 also couples computer 1200 to a network 1265 through a network adapter (not shown). In this manner, the computer can be a part of a network of computers (such as a local area network ("LAN"), a wide area network ("WAN"), or an Intranet) or a network of networks (such as the Internet). Any or all of the components of computer system 1200 may be used in conjunction with the invention. However, one of ordinary skill in the art would appreciate that any other system configuration may also be used in conjunction with the present invention.

While the invention has been described with reference to numerous specific details, one of ordinary skill in the art will recognize that the invention can be embodied in other specific forms without departing from the spirit of the invention. For instance, some embodiments are implemented in one or more separate modules, while other embodiments are implemented as part of a video editing application (e.g., Shake® provided by Apple Computer, Inc.). Thus, one of ordinary skill in the art will understand that the invention is not to be limited by the foregoing illustrative details, but rather is to be defined by the appended claims.

I claim:

1. A non-transitory computer readable medium storing a video editing application which when executed by at least one processing unit edits a sequence of video images, the video editing application comprising sets of instructions for:
   receiving a selection of a set of video images;
   in a graphical user interface (GUI) of the video editing application, displaying a set of at least three movement types that are individually selectable;
   concurrently receiving a user selection of a subset of at least two movement types, said subset having less movement types than the set of movement types;
   receiving input specifying a mask region in a subset of one or more of the video images;
   removing unwanted movement corresponding to said subset of at least two movement types from the set of video images without removing unwanted movement corresponding to at least one of the two movement types from the mask region in the subset of video images.

2. The non-transitory computer readable medium of claim 1, wherein said unwanted movement comprises a camera movement.

3. The non-transitory computer readable medium of claim 2, wherein said unwanted camera movement comprises a translation motion.

4. The non-transitory computer readable medium of claim 2, wherein said unwanted camera movement comprises a camera zoom operation.

5. A non-transitory computer readable medium, storing a video editing application having a graphical user interface ("GUI"), the video editing application executable by at least one processing the GUI comprising:
   a display area for displaying a video clip, the video clip comprising a plurality of video images;
   a movement selection tool for displaying a plurality of individually selectable movement types;
   a masking tool for specifying a masked region in a set of one or more video images from the plurality of video images; and
   a selectable GUI item for activating a smoothing operation that:
      when only one particular movement type is selected through the movement selection tool, removes the particular movement type from only a portion of the video clip that does not include the masked region; and
      when a plurality of movement types are selected through the movement selection tool, concurrently removes the plurality of selected movement types from only the same portion of the video clip.

6. The non-transitory computer readable medium of claim 5, wherein the movement types comprise camera movement types.

7. The non-transitory computer readable medium of claim 6, wherein the camera movement types comprise at least a translation motion and a zoom operation.

8. A non-transitory computer readable medium storing a video editing application which when executed by at least one processing unit edits a sequence of video images, the video editing application having a graphical user interface ("GUI"), the GUI comprising:
   a display area for displaying a video clip, the video clip comprising a plurality of video images;
   a movement selection tool for displaying a set of at least three movement types that are individually selectable;
   concurrently receiving a user selection of a subset of at least two movement types, said subset having less movement types than the set of movement types;
   a masking tool for specifying a mask region in a set of one or more of video images in the plurality of video images; and
   removing unwanted movement corresponding to said subset of at least two movement types from the plurality of video images without removing unwanted movement corresponding to at least one of the two movement types from the mask region in the set of video images.

9. The non-transitory computer readable medium of claim 8, wherein the selected subset of movement types includes a first translation motion in a first direction and a second translation motion in a second different direction.

10. The non-transitory computer readable medium of claim 8, wherein said unwanted movement comprises a camera zoom operation.

11. A non-transitory computer readable medium storing a computer program for editing a sequence of video images, the computer program executable by at least one processor, said computer program comprising sets of instructions for:
- defining a plurality of motion types, each motion type representing a different camera movement;
- generating a first set of a plurality of user adjustable curves, each of said first set curves representing a camera movement corresponding to one motion type of the plurality of motion types;
- receiving manual adjustments of a subset of one or more curves from the first set curves in response to user input;
- generating a second set of a plurality of curves, each of said second set curves being a smoothed version of a corresponding user adjustable first set curve, wherein a first subset of the second set curves corresponds to the subset of manually adjusted curves while a second subset of the second set curves does not correspond to the subset of manually adjusted curves;
- defining, for each motion type in said plurality of motion types, a transform operation from the user adjustable first set curve and the corresponding second set curve; and
- removing unwanted camera movements from the sequence of video images using said transform operations defined for the plurality of motion types.

12. The non-transitory computer readable medium of claim 11, wherein said unwanted camera movements comprise two camera translation motions along two different directions.

13. The non-transitory computer readable medium of claim 11, wherein said unwanted camera movements comprise a camera rotation motion and a camera zoom motion.

14. The non-transitory computer readable medium of claim 11, wherein the set of instructions for said generating the second set curves comprises a set of instructions for removing jagged edges from each first set curve.

15. The non-transitory computer readable medium of claim 11, wherein the set of instructions for said generating the second set curves comprises a set of instructions for using a heat diffusion model to smooth out each first set curve.

16. The non-transitory computer readable medium of claim 11, wherein the set of instructions for said removing comprises sets of instructions for:
- selecting a set of pixels to track between at least two images;
- generating a motion function that expresses a motion of the set of pixels between said at least two images; and
- using the generated motion function to remove the unwanted camera movements.

17. The non-transitory computer readable medium of claim 16, wherein the set of instructions for using the generated motion function comprises sets of instructions for:
- generating a function that expresses a difference between said at least two images based on the motion function; and
- finding a solution for the generated function.

18. A computer-implemented method for editing a sequence of video images, the method comprising:
- defining a plurality of motion types, each motion type representing a different camera movement;
- at a computer, generating a first set of a plurality of user adjustable curves, each of said first set curves representing a camera movement corresponding to one motion type of the plurality of motion types;
- receiving manual adjustments of a subset of one or more curves from the first set curves in response to user input;
- generating a second set of a plurality of curves, each of said second set curves being a smoothed version of a corresponding user adjustable first set curve, wherein a first subset of the second set curves corresponds to the subset of manually adjusted curves while a second subset of the second set curves does not correspond to the subset of manually adjusted curves;
- defining, for each motion type in said plurality of motion types, a transform operation from the user adjustable first set curve and the corresponding second set curve; and
- removing unwanted camera movements from the sequence of video images using said transform operations defined for the plurality of motion types.

19. The method of claim 18, wherein said unwanted camera movements comprise a camera translation motion, a camera rotation motion, and a camera zoom motion.

20. The method of claim 18, wherein said removing comprises:
- selecting a set of pixels to track between at least two images;
- generating a motion function that expresses a motion of the set of pixels between said at least two images; and
- using the generated motion function to remove the unwanted camera movements.

21. The method of claim 20 further comprising:
- generating a function that expresses a difference between said at least two images based on the motion function; and
- finding a solution for the generated function.

22. A non-transitory computer readable medium storing a video editing application having a graphical user interface ("GUI"), the video editing application executable by at least one processing unit, the GUI comprising:
- a display area for displaying a video clip;
- a movement selection tool for displaying a plurality of individually selectable movement types;
- a sensitivity tool for specifying in a sensitivity value for each individually selectable movement type from a plurality of sensitivity values associated with the plurality of selectable movement types; and
- a selectable GUI item for activating a smoothing operation that:
  - when only one particular movement type is selected through the movement selection tool, removes the particular movement type from at least a portion of the video clip; and
  - when a plurality of movement types are selected through the movement selection tool, concurrently removes the plurality of selected movement types from at least the same portion of the video clip.

23. The non-transitory computer readable medium of claim 22, wherein the GUI further comprises a range selection tool for specifying the portion of the video clip for the smoothing operation to analyze.

24. The non-transitory computer readable medium of claim 22, wherein the GUI further comprises a motion tracking display area for displaying, for each selected movement type, a curve that tracks camera motion over a set of video images of the video clip.

* * * * *